US009916525B2

(12) United States Patent
Mailhe et al.

(10) Patent No.: US 9,916,525 B2
(45) Date of Patent: Mar. 13, 2018

(54) LEARNING-BASED FRAMEWORK FOR PERSONALIZED IMAGE QUALITY EVALUATION AND OPTIMIZATION

(71) Applicant: Siemens Healthcare GmbH, Erlangen (DE)

(72) Inventors: Boris Mailhe, Plainsboro, NJ (US); Mariappan S. Nadar, Princeton, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 14/881,599

(22) Filed: Oct. 13, 2015

(65) Prior Publication Data

US 2017/0103512 A1    Apr. 13, 2017

(51) Int. Cl.
*G06K 9/62* (2006.01)
*G06K 9/66* (2006.01)
*G06T 5/00* (2006.01)
*G06K 9/03* (2006.01)
*G06T 7/00* (2017.01)

(52) U.S. Cl.
CPC ............... *G06K 9/66* (2013.01); *G06K 9/036* (2013.01); *G06T 5/001* (2013.01); *G06T 7/0002* (2013.01); *G06T 2207/10088* (2013.01); *G06T 2207/20081* (2013.01); *G06T 2207/20084* (2013.01); *G06T 2207/30168* (2013.01)

(58) Field of Classification Search
CPC .. G06T 7/002; G06T 7/00; G06T 5/00; G06T 7/0081; G06T 2207/20084; G06T 5/50; G06T 2207/10004; G06K 9/46

USPC ......................... 382/156, 167, 190, 112, 226
See application file for complete search history.

(56) References Cited

U.S. PATENT DOCUMENTS

| | | | | |
|---|---|---|---|---|
| 5,554,983 A | * | 9/1996 | Kitamura | G08G 1/04 340/905 |
| 2001/0023419 A1 | * | 9/2001 | Lapointe | G06F 19/345 706/15 |
| 2005/0100208 A1 | * | 5/2005 | Suzuki | G06T 5/007 382/157 |
| 2007/0095168 A1 | * | 5/2007 | Vince | G01N 15/1475 75/500 |
| 2010/0073395 A1 | * | 3/2010 | Kato | G06T 5/009 345/589 |
| 2011/0095875 A1 | * | 4/2011 | Thyssen | G09G 5/10 340/407.1 |
| 2012/0014586 A1 | * | 1/2012 | Kosarev | G06K 9/6232 382/132 |
| 2012/0051658 A1 | * | 3/2012 | Tong | G11B 27/034 382/224 |

(Continued)

Primary Examiner — Mekonen Bekele

(57) ABSTRACT

A computer-implemented method for providing image quality optimization individualized for a user includes a computer receiving raw image data acquired from an image scanner and identifying one or more raw image quality features based on the raw image data. The computer automatically determines one or more target image quality features by applying one or more user preferences to the one or more raw image quality features. The computer also automatically determines one or more processing parameters based on the one or more target image quality features. The computer may then process the raw image data using the one or more processing parameters to yield an image.

18 Claims, 3 Drawing Sheets

(56) References Cited

U.S. PATENT DOCUMENTS

| | | | | |
|---|---|---|---|---|
| 2013/0051516 A1* | 2/2013 | Yang | ........................ | A61B 6/03 |
| | | | | 378/4 |
| 2016/0011657 A1* | 1/2016 | Estacio | ................... | G06F 3/013 |
| | | | | 345/156 |
| 2016/0328644 A1* | 11/2016 | Lin | ........................ | G06N 3/08 |
| 2016/0379092 A1* | 12/2016 | Kutliroff | .............. | G06K 9/6256 |
| | | | | 382/158 |

\* cited by examiner

LEARNING-BASED FRAMEWORK FOR PERSONALIZED IMAGE QUALITY EVALUATION AND OPTIMIZATION

TECHNICAL FIELD

The present invention relates generally to methods, systems, and apparatuses for a learning-based framework for personalized imaging quality evaluation and optimization. The disclosed methods, systems, and apparatuses may be applied to, for example, imaging modalities in the medical imaging field and others.

BACKGROUND

Imaging devices such as Magnetic Resonance Imaging (MRI) scanners provide myriad options which refine image acquisition or processing procedures based on feedback from the user. In order to provide meaningful feedback, the user must be able to articulate his or her concerns in terms of image quality. However, image quality is a fuzzy notion. It varies with the modality, the use-case, and the customer. There are several steps in the imaging and rendering chain which have parameters that can be tuned to affect image quality, but finding the right tuning requires solving two challenging problems. First, since there is not an established description standard for image quality, it is challenging for users to comment upon, or suggest modifications to, image data or its related parameters. Secondly, even when the customer requirements are known, determining the optimal parameter settings may be difficult. For example, a particular change to an image characteristic may require changes to several, unknown parameters.

Moreover, the act of getting feedback on image quality is very much of an art. For example, often a service engineer must visit the customer site and proceed by trial and error: dialoging with the customer to try to understand their problem, tuning the parameters, showing the result to the customer, and iterating until the customer is satisfied with the result. This process is time intensive and wastes resources. Accordingly, it is desired to create a technique for gathering image feedback which may be automated, but still personalized, to address the issues set out above.

SUMMARY

Embodiments of the present invention address and overcome one or more of the above shortcomings and drawbacks, by providing methods, systems, and apparatuses related to a learning-based framework for individualized image quality prediction and optimization.

According to some embodiments, a computer-implemented method for providing image quality optimization individualized for a user includes a computer receiving raw image data acquired from an image scanner and identifying one or more raw image quality features based on the raw image data. The computer automatically determines one or more target image quality features by applying one or more user preferences to the one or more raw image quality features. The computer also automatically determines one or more processing parameters based on the one or more target image quality features. The computer may then process the raw image data using the one or more processing parameters to yield an image.

The aforementioned method may be refined, supplemented, or otherwise modified in various embodiments. For example, in some embodiments, the method further includes providing the image to the user in a feedback interface which allows the user to associate a preference indicator with the image. This preference indictor may be, for example, a binary tag set to one of an accept value or a reject value and/or a numerical value selected from a range of numerical values. The feedback interface may be further configured to identify new image quality features based on the preference indicator. The target image quality features may then be modified based on the new image quality features. In some embodiments, the processing parameters are determined using a deep learning network (e.g., an artificial neural network) where the target image quality features are an input. The raw image data and/or the one or more raw image quality features may be used as an additional input to this network.

According to other embodiments, an article of manufacture for providing image quality optimization individualized for a user comprises a non-transitory, tangible computer-readable medium holding computer-executable instructions for performing the aforementioned method, with or without the additional features discussed above.

According to other embodiments, a system for providing image quality optimization individualized for a user includes an image scanner configured to acquire raw image data and a computer comprising one or more processors. The computer's processors are configured to (i) identify one or more raw image quality features based on the raw image data; (ii) determine one or more target image quality features by applying one or more user preferences to the one or more raw image quality features; (iii) determine one or more processing parameters based on the one or more target image quality features; and (iv) process the raw image data using the one or more processing parameters to yield an image. In some embodiments, the system further includes a feedback interface configured to present the image to the user and receive a preference indicator associated with the image from the user. The computer's processors may be further configured to modify the user preferences based on that preference indicator.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to the automation of personalized parameter tuning for imaging applications. Briefly, a database of imaging device information is leveraged and big data methods are applied to learn what the customers want directly from them. The disclosed techniques are able to prescribe default parameters to fit each user's preferences, allow the user to fine tune those parameters intuitively on his own, and learn from the user's own tuning to refine the default parameters. The examples presented below illustrate the applicability of automation of personalized parameter tuning in the context of Magnetic Resonance Imaging (MRI). However, it should be understood that the techniques described herein may be generally applied to various imaging modalities, in the medical imaging field and others.

User preferences for image processing are non-linear and non-physical. Any model is bound to be complex and only able to be validated empirically. Additionally, these preferences are dynamic in the sense that they can change over time. The feature space to represent image quality cannot be known a priori. To address this lack of knowledge, the systems, methods, and apparatuses described herein apply deep learning techniques.

Figure 1:
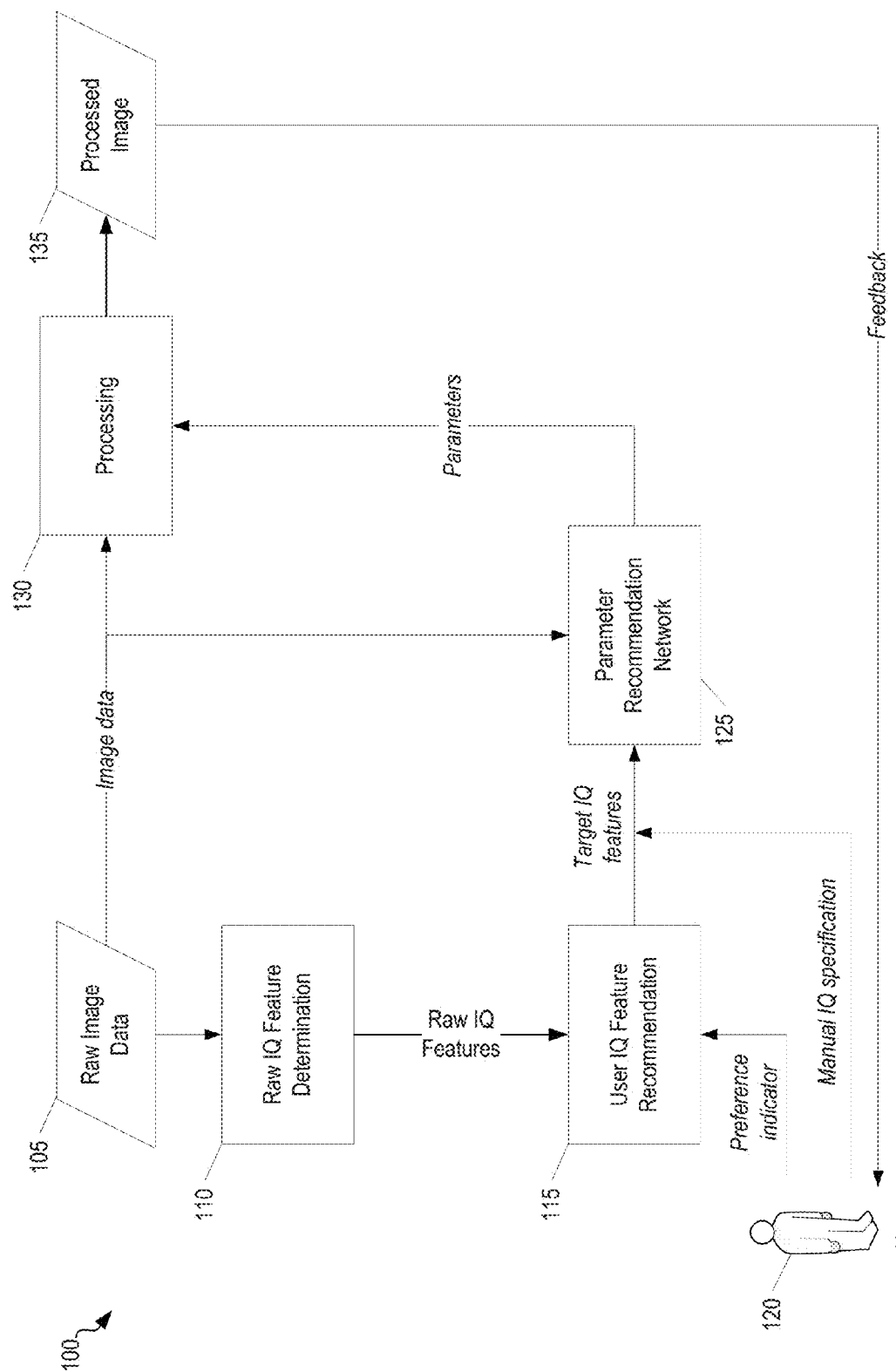
FIG. 1 provides an overview of a learning-based framework for individualized image quality prediction and optimization, according to some embodiments.

FIG. 1 provides an overview of a learning-based framework 100 for individualized image quality prediction and optimization, according to some embodiments. The initial input to this framework 100 is Raw Image Data 105. In some embodiments, this framework 100 is implemented in a live system on a computing device directly connected to the image scanner that acquires the Raw Image Data 105. In other embodiments, the Raw Image Data 105 may be acquired from a database or other computer readable medium storing previously acquired data.

The Raw Image Data 105 is processed by a Raw Image Quality (IQ) Feature Determination Component 110 to determine non-linear statistics, referred to herein as IQ features, associated with the Raw Image Data 105. Examples of IQ features include the brightness, the contrast, resolution, and amount of noise present in the image data. These IQ features provide a standardized qualitative tool to described image quality.

In some embodiments, the raw IQ features are automatically determined by the Raw Image Quality (IQ) Feature Determination Component 110 using any technique generally known in the art. For example, the Raw Image Quality (IQ) Feature Determination Component 110 may be pre-configured with a list of IQ features and algorithms for determining values for these features based on the image data. In other embodiments, the Raw IQ Feature Determination Component 110 automatically extracts the raw IQ features from metadata associated with the acquisition of the Raw Image Data 105. This metadata may be provided in the Raw Image Data 105 itself or, alternatively, in one or more associated files. In other embodiments, the individual that acquired the Raw Image Data 105 may manually supply the raw IQ features via interaction with a graphical user interface (GUI) providing functionality for the Raw IQ Feature Determination Component 110. In other embodiments, the method to extract the raw IQ features is learnt from a database of images. This learning can be supervised (i.e., the numerical values of the raw IQ features of the training images are known), unsupervised (i.e., the numerical values of the raw IQ features of the training images are not known, and the quality of the raw IQ features is inferred from the user satisfaction with the whole system), or semi-supervised (i.e., the numerical values of the raw IQ features is known for some of the training images, but not all of them.)

The raw IQ features are used as input to a User IQ Feature Recommendation Component 115. The User IQ Feature Recommendation Component 115 transforms the raw IQ features derived from the Raw Image Data 105 into a set of target IQ features which are individualized for a particular User 120. Ideally, the number of target IQ features should be relatively small and highly correlated with image quality.

The User IQ Feature Recommendation Component 115 may be implemented via a deep learning network such as, for example, an artificial neural network. The deep learning network may be trained based on the past behavior of the User 120 when operating the imaging system. This deep learning network may be trained using supervised or unsupervised methods. In some embodiments, each user is surveyed with a set of pre-generated images and the User 120 identifies adjustments to image features. This survey may be conducted in an interactive way. For example, the user may be presented with each image in a graphical user interface and be allowed to adjust sliders or some other graphical component to indicate changes to IQ features. In embodiments where unsupervised techniques are used, the deep learning network may be trained based on the feedback provided to the User 120. For example, by comparing the IQ features associated with images rejected by the user with the IQ features associated with images deemed acceptable by the user, a set of preferred IQ features can be learned over time.

Continuing with reference to FIG. 1, the Raw Image Data 105 and the target IQ features determined by the User IQ Feature Recommendation Component 115 are processed by a Parameter Recommendation Network 125 to identify image processing parameters. This allows the user to tune IQ features rather than specific parameters that may be used to achieve those features. The Parameter Recommendation Network 125 is implemented as a model trained with images processed with different parameters and their IQ features. This model effectively maps a set of IQ features to parameters which may be applied to the image scanner. The exact parameters that are determined by the Parameter Recommendation Network 125 will vary depending on the imaging modality and the capabilities of the specific image scanner used for image acquisition.

One or more deep learning models generally known in the art may be used to implement the Parameter Recommendation Network 125 within a supervised or unsupervised learning paradigm. For example, in one embodiment, the Parameter Recommendation Network 125 is an artificial neural network. In the example of FIG. 1, the Parameter Recommendation Network 125 has two inputs: the target IQ parameters (determined by the User IQ Feature Recommendation Component 115) and the Raw Image Data 105. However, the full image may not be required to estimate the right parameters. Thus, in other embodiments, the inputs may be the raw IQ features (determined by the Raw IQ Feature Determination Component 110) and the target IQ features.

The Processing Component 130 uses the parameters determined by the Parameter Recommendation Network 125 to processing the Raw Image Data 105. The Processing Component 130 may implement any of a variety of specific image processing algorithms generally known in the art for the particular imaging modality being supported by the framework 100. The results of processing by the Processing Component 130 are the Processed Image(s) 135.

In FIG. 1, a feedback loop is utilized wherein the Processed Image 135 is presented to the User 120 in a graphical user interface (GUI) which is configured to monitor the response of the User 120 to the image. For example, in some embodiments, the GUI may be provided by a proprietary tool such as Siemens CLEARChoice. Based on the response of the User 120 to the Processed Image 135, the operation of the framework 100 may be modified. For example, the response of the User 120 can be used to refine the IQ feature transformations performed by the Raw IQ Feature Determination Component 110. Additionally, the response may be used to generate training data with synthetic labels for the User IQ Feature Recommendation Component 115. This concept may even be extended such that the responses from a large population may be aggregated and users can be clustered based on their individual responses.

In some embodiments, the response of the User 120 to the Processed Image 135 is provided in the form of a preference indicator. For example, in some embodiments users provided a preference score, while in other embodiments a simple accept/reject tag is used. Although the preference score provides the benefit of allowing the user to specify preferences within a range of values, the binary tag may be more efficient in embodiments where user preference is modeled as a classifier learning program. Thus, a binary classifier can be learned that would accept the same changes as the user. Moreover, in some embodiments, the user's preferences may be inferred based on actions related the image performed outside of the outside of the feedback interface. For example, the user's reactions to the image (e.g., saving, discarding, etc.) may be used to infer acceptance or rejection of the image.

Note that there is a bootstrapping problem associated with the framework 100 illustrated in FIG. 1. Specifically the Parameter Recommendation Network 125 is needed to gather large scale training data, but the IQ feature transform must be learned to build the Parameter Recommendation Network 125. To train the IQ features several user responses (ideally, many more than the number of features) are needed. To address the bootstrapping problem, in some embodiments, the framework learns from simulated users. The simulated users are configured such that their preferences remain consistent across images. Various techniques may be used for creating the simulated users. For example, in some embodiments, Product Specialists use their expertise to simulate users manually (possibly, also simulating different quality characteristics across different vendor image scanners). In other embodiments, recognizing that different scanners have different responses, the output of different scanners is used to simulate users. For example, one group of simulated users may prefer the default parameter settings for a particular scanner. In other embodiments, a testing panel is used. In other embodiments, learning is performed on images with known deformations or degradations with users modelled by decision rules. Additionally, two or more of the techniques discussed above may be used in combination to create the synthetic users.

To provide a more detailed example of synthetic user creation, consider a set of pre-generated clinical images. These original images are initially designated as "the gold standard" that all users would accept. For each image, a group of degraded images are generated with various degrees of blurring, motion, noise, etc. The exact degradations may vary, for example, based on their relevance to the modality used to acquire the images. Different users may then be modeled by different sensitivities to the degradations: i.e., from a given degraded image, which images in the same group will the user accept? Note that no user input needed for this technique and clinical images can be re-used at different degradation levels.

Figure 2:
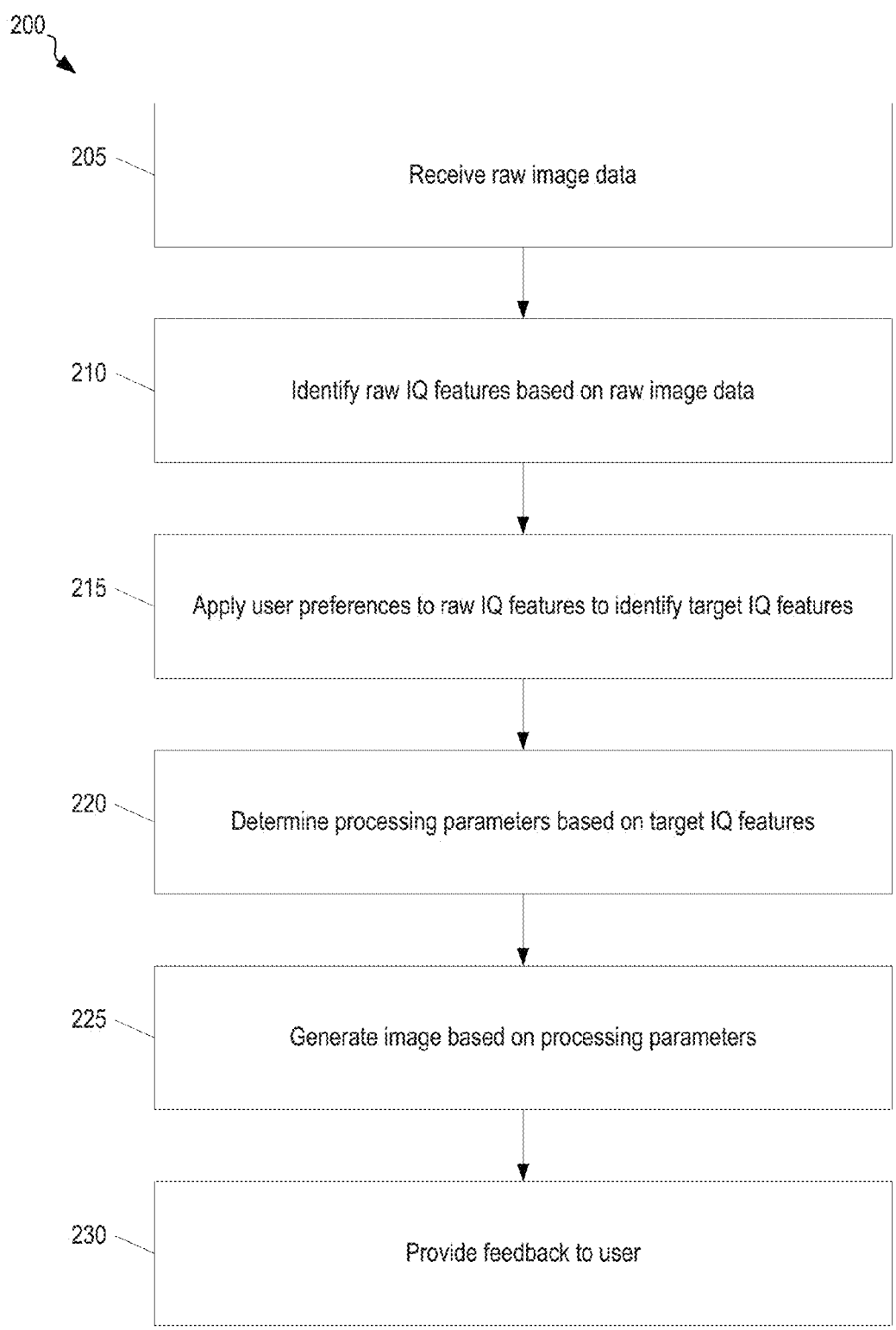
FIG. 2 shows a process which applies the framework shown in FIG. 1 to provide image quality optimization individualized for a user.

FIG. 2 shows a process 200 which applies the framework 100 shown in FIG. 1 to provide image quality optimization individualized for a user. This process 200 may be implemented, for example, on an image processing computer associated with image scanner in a live setting or, alternatively on an offline computing system which is able to communicate parameters to the image processing computer.

Initially, at step 205, raw image data received, either directly from the image scanner that acquired the data or via retrieval from a data base storing previously acquired data. The imaging modality associated with the raw image data should be known, or inferable, via the raw image data. In instances where the framework 100 is implemented in a live imaging setting (e.g., on an image data processor associated with the image scanner), the imaging modality can be pre-configured. In other situations, where the process 200 is used in an environment with several types of imaging modalities being managed in a single processing environment, metadata information from the raw image data or manual user input may be used to identify the imaging modality associated with the raw image data.

Continuing with reference to FIG. 2, at step 210, one or more raw IQ features are identified based on the raw image data. The exact raw IQ features will depend on the imaging modality used to acquire the raw image data; however, there may be certain features that are common across all imaging modalities. The values of the raw IQ features may be determined using any technique generally known in the art. For example, image contrast may be determined using a technique such as the Weber method, the Michaelson method, or the standard deviation of the pixel intensities. The determined image contrast value can then be compared to a preset nominal value for contrast to create a raw IQ feature of "high contrast," "low contrast," or "nominal contrast." At step 215, one or more user preferences are applied to the raw IQ features to identify a set of target IQ features for that user. As noted above with reference to FIG. 1, user preferences may be applied to the raw IQ features using a deep learning model trained based on previous feedback received from the user. Next, at step 220, processing parameters are determined based on the target IQ features determined at step 220. These processing parameters will depend on the exact algorithm being used to process the raw image data. Then, at step 225, the raw image data is processed to yield a final image customized to the user's preferences.

The generated image is presented to the user at step 230 in a feedback interface which is configured to allow the user to associate a preference indicator with the image. This preference indicator may then be used to refine the user preferences employed in the determination of the target IQ features. Additionally, in some embodiments, the feedback interface also provides a list of the IQ features used in the generation of the image. The user may then add new IQ features to be used in parameter generation. In some embodiments, the feedback interface may also be used to remove or modify existing IQ features for use in the processing of future images.

Figure 3:
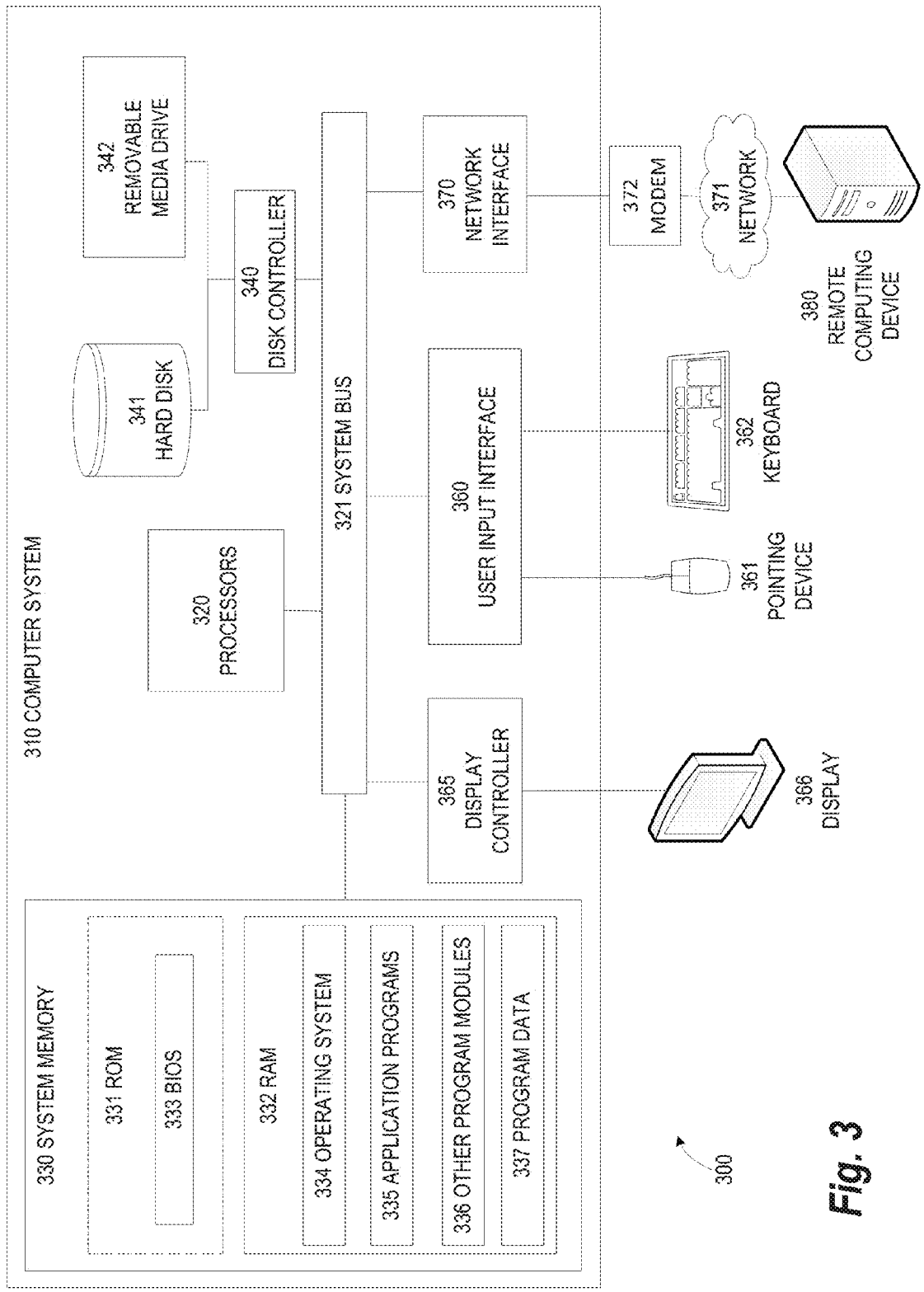
FIG. 3 illustrates an exemplary computing environment within which embodiments of the invention may be implemented.

FIG. 3 illustrates an exemplary computing environment 300 within which embodiments of the invention may be implemented. For example, this computing environment 300 may be configured to implement one or more components of the framework 100 described in FIG. 1 or the process 200 illustrated in FIG. 2. The computing environment 300 may include computer system 310, which is one example of a computing system upon which embodiments of the invention may be implemented. Computers and computing environments, such as computer system 310 and computing environment 300, are known to those of skill in the art and thus are described briefly here.

As shown in FIG. 3, the computer system 310 may include a communication mechanism such as a bus 321 or other communication mechanism for communicating information within the computer system 310. The computer system 310 further includes one or more processors 320 coupled with the bus 321 for processing the information. The processors 320 may include one or more central processing units (CPUs), graphical processing units (GPUs), or any other processor known in the art.

The computer system 310 also includes a system memory 330 coupled to the bus 321 for storing information and instructions to be executed by processors 320. The system memory 330 may include computer readable storage media in the form of volatile and/or nonvolatile memory, such as read only memory (ROM) 331 and/or random access memory (RAM) 332. The system memory RAM 332 may include other dynamic storage device(s) (e.g., dynamic RAM, static RAM, and synchronous DRAM). The system memory ROM 331 may include other static storage device(s) (e.g., programmable ROM, erasable PROM, and electrically erasable PROM). In addition, the system memory 330 may be used for storing temporary variables or other intermediate information during the execution of instructions by the processors 320. A basic input/output system (BIOS) 333 containing the basic routines that help to transfer information between elements within computer system 310, such as during start-up, may be stored in ROM 331. RAM 332 may contain data and/or program modules that are immediately accessible to and/or presently being operated on by the processors 320. System memory 330 may additionally include, for example, operating system 334, application programs 335, other program modules 336 and program data 337.

The computer system 310 also includes a disk controller 340 coupled to the bus 321 to control one or more storage devices for storing information and instructions, such as a hard disk 341 and a removable media drive 342 (e.g., floppy disk drive, compact disc drive, tape drive, and/or solid state drive). The storage devices may be added to the computer system 310 using an appropriate device interface (e.g., a small computer system interface (SCSI), integrated device electronics (IDE), Universal Serial Bus (USB), or FireWire).

The computer system 310 may also include a display controller 365 coupled to the bus 321 to control a display 366, such as a cathode ray tube (CRT) or liquid crystal display (LCD), for displaying information to a computer user. The computer system includes an input interface 360 and one or more input devices, such as a keyboard 362 and a pointing device 361, for interacting with a computer user and providing information to the processor 320. The pointing device 361, for example, may be a mouse, a trackball, or a pointing stick for communicating direction information and command selections to the processor 320 and for controlling cursor movement on the display 366. The display 366 may provide a touch screen interface which allows input to supplement or replace the communication of direction information and command selections by the pointing device 361.

The computer system 310 may perform a portion of or all of the processing steps of embodiments of the invention in response to the processors 320 executing one or more sequences of one or more instructions contained in a memory, such as the system memory 330. Such instructions may be read into the system memory 330 from another computer readable medium, such as a hard disk 341 or a removable media drive 342. The hard disk 341 may contain one or more datastores and data files used by embodiments of the present invention. Datastore contents and data files may be encrypted to improve security. The processors 320 may also be employed in a multi-processing arrangement to execute the one or more sequences of instructions contained in system memory 330. In alternative embodiments, hard-wired circuitry may be used in place of or in combination with software instructions. Thus, embodiments are not limited to any specific combination of hardware circuitry and software.

As stated above, the computer system 310 may include at least one computer readable medium or memory for holding instructions programmed according to embodiments of the invention and for containing data structures, tables, records, or other data described herein. The term "computer readable medium" as used herein refers to any medium that participates in providing instructions to the processor 320 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 341 or removable media drive 342. Non-limiting examples of volatile media include dynamic memory, such as system memory 330. Non-limiting examples of transmission media include coaxial cables, copper wire, and fiber optics, including the wires that make up the bus 321. Transmission media may also take the form of acoustic or light waves, such as those generated during radio wave and infrared data communications.

The computing environment 300 may further include the computer system 310 operating in a networked environment using logical connections to one or more remote computers, such as remote computer 380. Remote computer 380 may be a personal computer (laptop or desktop), a mobile device, a server, a router, a network PC, a peer device or other common network node, and typically includes many or all of the elements described above relative to computer system 310. When used in a networking environment, computer system 310 may include modem 372 for establishing communications over a network 371, such as the Internet. Modem 372 may be connected to bus 321 via user network interface 370, or via another appropriate mechanism.

Network 371 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 310 and other computers (e.g., remote computer 380). The network 371 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 371.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for providing image quality optimization individualized for a user, the method comprising:

receiving, by a computer, raw image data acquired from an image scanner;
identifying, by the computer, one or more raw image quality features based on the raw image data;
using a first deep learning network to automatically determine one or more target image quality features based on the one or more raw image quality features, wherein the first deep learning network is trained based on past behavior of a user when operating the image scanner;
using a second deep learning network to automatically determine one or more processing parameters for processing the raw image data based on the one or more target image quality features;
processing the raw image data using the one or more processing parameters to yield an image.

2. The method of claim 1, further comprising:
providing the image to the user in a feedback interface configured to allow the user to associate a preference indicator with the image.

3. The method of claim 2, wherein the preference indicator is a binary tag set to one of an accept value or a reject value.

4. The method of claim 2, wherein the preference indicator is a numerical value selected from a range of numerical values.

5. The method of claim 2, wherein the feedback interface is further configured to identify one or more new image quality features based on the preference indicator and the method further comprises:
modifying the one or more target image quality features based on the one or more new image quality features.

6. The method of claim 1, wherein the raw image data is an additional input to the first deep learning network.

7. The method of claim 1, wherein the one or more raw image quality features are an additional input to the first deep learning network.

8. The method of claim 1, wherein the first deep learning network is an artificial neural network.

9. An article of manufacture for providing image quality optimization individualized for a user, the article of manufacture comprising a non-transitory, tangible computer-readable medium holding computer-executable instructions for performing a method comprising:
receiving raw image data acquired from an image scanner;
identifying one or more raw image quality features based on the raw image data;
using a first deep learning network to automatically determine one or more target image quality features based on the one or more raw image quality features, wherein the first deep learning network is trained based on past behavior of a user when operating the image scanner;
using a second deep learning network to automatically determine one or more processing parameters for processing the raw image data based on the one or more target image quality features; and
processing the raw image data using the one or more processing parameters to yield an image.

10. The article of manufacture of claim 9, wherein the method further comprises:
providing the image to the user in a feedback interface configured to allow the user to associate a preference indicator with the image.

11. The article of manufacture of claim 10, wherein the preference indicator is a binary tag set to one of an accept value or a reject value.

12. The article of manufacture of claim 10, wherein the preference indicator is a numerical value selected from a range of numerical values.

13. The article of manufacture of claim 10, wherein the feedback interface is further configured to identify one or more new image quality features based on the preference indicator and the method further comprises:
modifying the one or more target image quality features based on the one or more new image quality features.

14. The article of manufacture of claim 9, wherein the raw image data is an additional input to the first deep learning network.

15. The article of manufacture of claim 9, wherein the one or more raw image quality features are an additional input to the first deep learning network.

16. A system for providing image quality optimization individualized for a user, the system comprising:
an image scanner configured to acquire raw image data;
a computer comprising one or more processors configured to:
identify one or more raw image quality features based on the raw image data;
use a first deep learning network to automatically determine one or more target image quality features based on the one or more raw image quality features, wherein the first deep learning network is trained based on past behavior of a user when operating the image scanner;
use a second deep learning network to automatically determine one or more processing parameters for processing the raw image data based on the one or more target image quality features;
process the raw image data using the one or more processing parameters to yield an image.

17. The system of claim 16, further comprising:
a feedback interface configured to present the image to the user and receive a preference indicator associated with the image from the user.

18. The system of claim 17, wherein the one or more processors are further configured to modify the one or more user preferences based on the preference indicator.

* * * * *